(12) United States Patent
Porcella

(10) Patent No.: US 6,588,789 B1
(45) Date of Patent: Jul. 8, 2003

(54) ADJUSTABLE SUPPORT FOR SPORTS MOTORCYCLE

(76) Inventor: Robert P. Porcella, 1142 Menlo Ave., Clovis, CA (US) 93612

( * ) Notice: Subject to any disclaimer, the term of this patent is extended or adjusted under 35 U.S.C. 154(b) by 0 days.

(21) Appl. No.: 10/086,528

(22) Filed: Mar. 1, 2002

(51) Int. Cl.⁷ .............................................. B62K 19/40
(52) U.S. Cl. ..................................................... 280/290
(58) Field of Search ........................... 180/219; 280/290, 280/288.4, 293, 304.1; 248/299.1; 224/413

(56) References Cited

U.S. PATENT DOCUMENTS

| | | | |
|---|---|---|---|
| 565,880 A | * | 8/1896 | Cleveland |
| 575,787 A | * | 1/1897 | Voitek |
| 4,059,207 A | | 11/1977 | Jackson et al. |
| 4,359,233 A | * | 11/1982 | Jackson et al. ......... 280/289 A |
| 4,416,465 A | * | 11/1983 | Winiecki .................... 280/290 |
| 4,750,658 A | | 6/1988 | Jennings |
| 4,978,167 A | * | 12/1990 | Harvey ........................ 297/195 |
| 5,001,779 A | * | 3/1991 | Eggert et al. ............... 455/346 |
| 5,076,598 A | * | 12/1991 | Nauman ..................... 230/202 |
| 5,326,122 A | | 7/1994 | Duffy |
| 5,383,677 A | | 1/1995 | Thomas et al. |
| D371,537 S | | 7/1996 | Jennings |
| 6,076,846 A | | 6/2000 | Clardy |
| 6,131,935 A | * | 10/2000 | Judkins ....................... 280/290 |

* cited by examiner

Primary Examiner—Avraham Lerner

(57) ABSTRACT

An adjustable support for use on a sports motorcycle. The adjustable support for sports motorcycle includes an adjustable support structure for bearing the weight of a driver's body and head while driving in an enclosed outer envelope that can also be utilized as a storage container. The support is attached to a sports motorcycle by use of straps. The support mechanism includes a cushioned portion for the chest and a second cushioned portion to place the chin. The support device is assisted through use of a spring bias to absorb shock and eliminate engine and road vibration.

17 Claims, 5 Drawing Sheets

ADJUSTABLE SUPPORT FOR SPORTS MOTORCYCLE

BACKGROUND OF THE INVENTION

1. Field of the Invention

The present invention relates to cycle supports and more particularly pertains to a new adjustable support for sports motorcycle for use on a sports motorcycle.

2. Description of the Prior Art

The use of cycle supports is known in the prior art. More specifically, cycle supports heretofore devised and utilized are known to consist basically of familiar, expected and obvious structural configurations, notwithstanding the myriad of designs encompassed by the prior art, which have been developed for the fulfillment of countless objectives and requirements.

Known prior art includes U.S. Pat. No. 4,059,207, which teaches a carrying container designed for mounting on a motorcycles gas tank. The patent does not teach the support of the driver's body or head while driving.

U.S. Pat. No. 4,750,658 teaches a carrying container for instruments designed for mounting on a motorcycles gas tank. The patent does not teach the support of the driver's body or head while driving.

U.S. Pat. No. 5,326,122 teaches a support for bicyclist mounted on the handlebars of the bicycle and adjustable between a position of use and a position of non-use. The patent does not teach supporting the driver's head with a chin pad, or the enclosure of the device in a padded envelope that can also be used to store items or the mounting of the device on the gas tank of a motorcycle.

U.S. Pat. No. 5,383,677 teaches a body support mounted to the cross tube portion of a bicycle. The patent does not teach supporting the drivers head with a chin pad, or the enclosure of the device in a padded envelope that can also be used to store items or the mounting of the device on the gas tank of a motorcycle.

U.S. Pat. No. 6,076,846 teaches a body support similar to U.S. Pat. No. 5.383,677 mounted to the cross tube portion of a bicycle. This patent includes means to adjust the chest pad to various levels via a pair of curved tubes. The patent does not teach supporting the drivers head with a chin pad, or the enclosure of the device in a padded envelope that can also be used to store items or the mounting of the device on the gas tank of a motorcycle.

U.S. Design Pat. No. Des. 371,537 teaches the ornamental design of a carrying case mounted to a motorcycle gas tank but does not anticipate a chin support or any mechanical support adjustments.

While these devices fulfill their respective, particular objectives and requirements, the aforementioned patents do not disclose a new adjustable support for sports motorcycle. The inventive device includes an adjustable support structure for bearing the weight of a driver's body and head enclosed in an outer envelope that can also be utilized as a storage container.

In these respects, the adjustable support for sports motorcycle according to the present invention substantially departs from the conventional concepts and designs of the prior art, and in so doing provides an apparatus primarily developed for the purpose of use on a sports motorcycle.

SUMMARY OF THE INVENTION

Due to the unique design of high performance or sports motorcycles, commonly known as crotch rockets, the drivers are forced to assume a peculiar position. This position, in which the seat is located relatively at the same vertical level as the handlebars, and with the head elevated above the front cowling, may become uncomfortable and adversely affect the driver's ability to maintain control of the vehicle if maintained for a prolonged period. As a remedy for the discomfort associated with the operating stance of sports motorcycles, it is beneficial to provide support to the torso and head of the driver with an apparatus that not only provides support but also buffers the transmission of the vibration of the engine and the shocks of the road to the driver. Additionally, it would be beneficial if such a device was aerodynamically streamlined, adjustable to accommodate a variety of drivers and also had the ability to store items. These specific requirements have not been addressed in the art of cycle supports heretofore although there is a clearly evident need In view of the foregoing disadvantages inherent in the known types of cycle supports now present in the prior art, the present invention provides a new adjustable support for sports motorcycle construction wherein the same can be utilized for use on a sports motorcycle.

The general purpose of the present invention, which will be described subsequently in greater detail, is to provide a new adjustable support for sports motorcycle apparatus and method which fulfill the needs of sports motorcycle design and the many novel features that result in a new adjustable support for sports motorcycle which is not anticipated, rendered obvious, suggested, or even implied by any of the prior art cycle supports, either alone or in any combination thereof.

To attain this, the present invention generally comprises an adjustable support structure for bearing the weight of a driver's body and head enclosed in an outer envelope that can also be utilized as a storage container.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new adjustable support for sports motorcycle apparatus and method that meet the unique needs of sports motorcycles mentioned heretofore and includes many novel features that result in a new adjustable support for sports motorcycle which is not anticipated, rendered obvious, suggested, or even implied by any of the prior art cycle supports, either alone or in any combination thereof.

It is another object of the present invention to provide a new adjustable support for sports motorcycle, which may be easily and efficiently manufactured and marketed.

It is a further object of the present invention to provide a new adjustable support for sports motorcycle, which is of a durable and reliable construction.

An even further object of the present invention is to provide a new adjustable support for sports motorcycle which is susceptible of a low cost of manufacture with regard to both materials and labor, and which accordingly is then susceptible of low prices of sale to the consuming public, thereby making such adjustable support for sports motorcycle economically available to the buying public.

Still yet another object of the present invention is to provide a new adjustable support for sports motorcycle, which provides in the apparatuses and methods of the prior art some of the advantages thereof, while simultaneously overcoming some of the disadvantages normally associated therewith.

Still another object of the present invention is to provide a new adjustable support for sports motorcycle that meets the particular needs necessitated by sports motorcycle design and the specific needs of sports motorcycle drivers.

Yet another object of the present invention is to provide a new adjustable support for sports motorcycle, which includes an adjustable support structure for bearing the weight of a driver's body and head enclosed in an outer envelope that can also be utilized as a storage container.

Still yet another object of the present invention is to provide a new adjustable support for sports motorcycle that eliminates the discomfort associated with maintaining the driving position required by a sports motorcycle design.

Even still another object of the present invention is to provide a new adjustable support for sports motorcycle that can accommodate a variety of users by providing adjustable fit and operating parameters.

Still yet another object of the present invention is to provide a new adjustable support for sports motorcycle that is multi functional in that it may be used for a secondary purpose, such as use as a storage container.

These together with other objects of the invention, along with the various features of novelty, which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
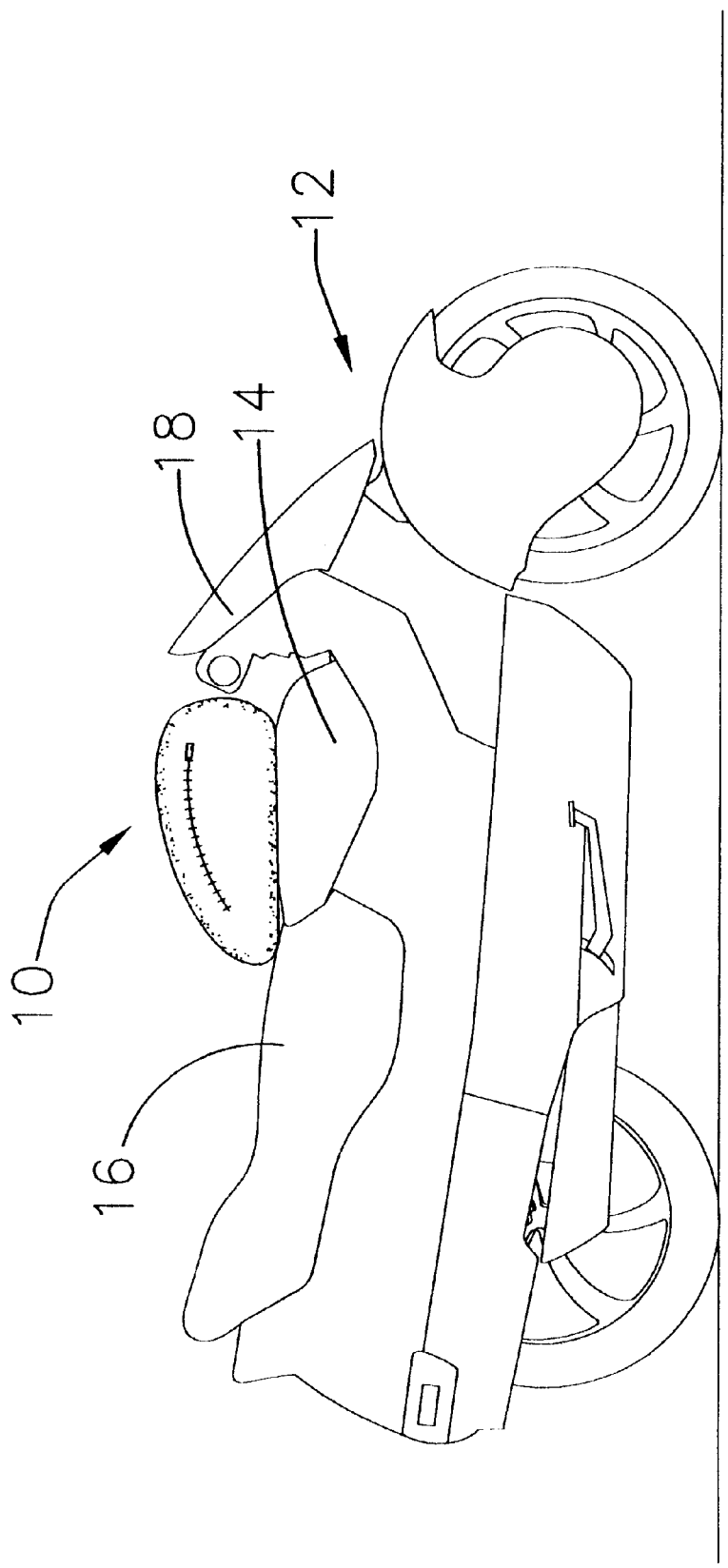
FIG. 1 is a profile view of a new adjustable support for sports motorcycle mounted on a sports motorcycle according to the present invention.

With reference now to the drawings, and in particular to FIGS. 1 through 5 thereof, a new adjustable support for sports motorcycle embodying the principles and concepts of the present invention and generally designated by the reference numeral 10 will be described.

As best illustrated in FIGS. 1 through 5, the adjustable support for sports motorcycle 10 generally comprises an outer envelope 20 that contains a body support mechanism 50. The combination may be mounted to the gas tank 14 of a sports motorcycle 12 for the purpose of supporting the user's weight while driving.

The outer envelope 20 may be composed of a relatively flexible and durable material such as nylon, Duralon™, Kevlar™, polyester, polyurethane, lycra, spandex, vinyl, cotton, denim, canvas, wool, fleece, silk, jute, leather, etc. Because the outer envelope may be relatively exposed to the elements, it may be beneficial if the material was watertight. Due to the fact that the material will be in contact with the user while in use, it may be beneficial if the material was relatively soft and comfortable against the skin.

The shape of the outer envelope 20 as depicted in the drawings is relatively wedge shaped to accommodate the interior support mechanism, but the invention is not so limited. Optional shapes, such as a hemispheroid, ellipsoid, rhomboid, arm shaped, etc., may also be employed on the preferred embodiment of the support mechanism 50. It will be realized that a multitude of other shapes may be employed with other support mechanism designs. The embodiment of the outer envelope depicted in the drawings has a wedge shape, and includes a bottom 24 that is the part of the support mechanism that may be mounted to the gas tank 14. The outer envelope may also include a top 26 that is the part of the envelope that is directed toward or faces the driver, and is the part of the envelope that the driver may rest a portion of his or her body against. The outer envelope also includes two sides that are disposed towards the left and right sides 28 of the sports motorcycle 12. The outer envelope may also include a front 22 that faces the cowling 18 of motorcycle during use.

Figure 2:
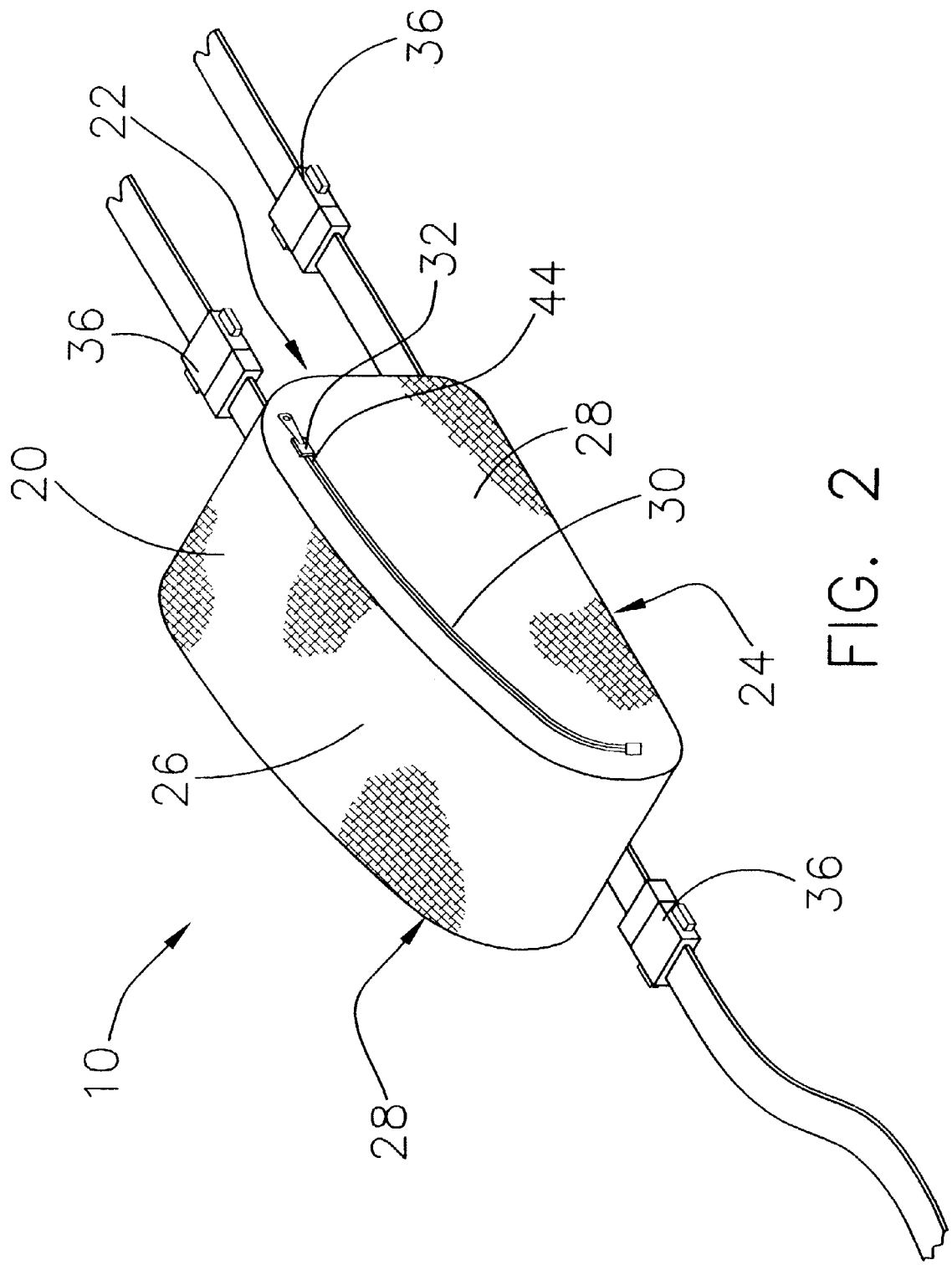
FIG. 2 is a perspective view of the exterior of the present invention.
Figure 3:
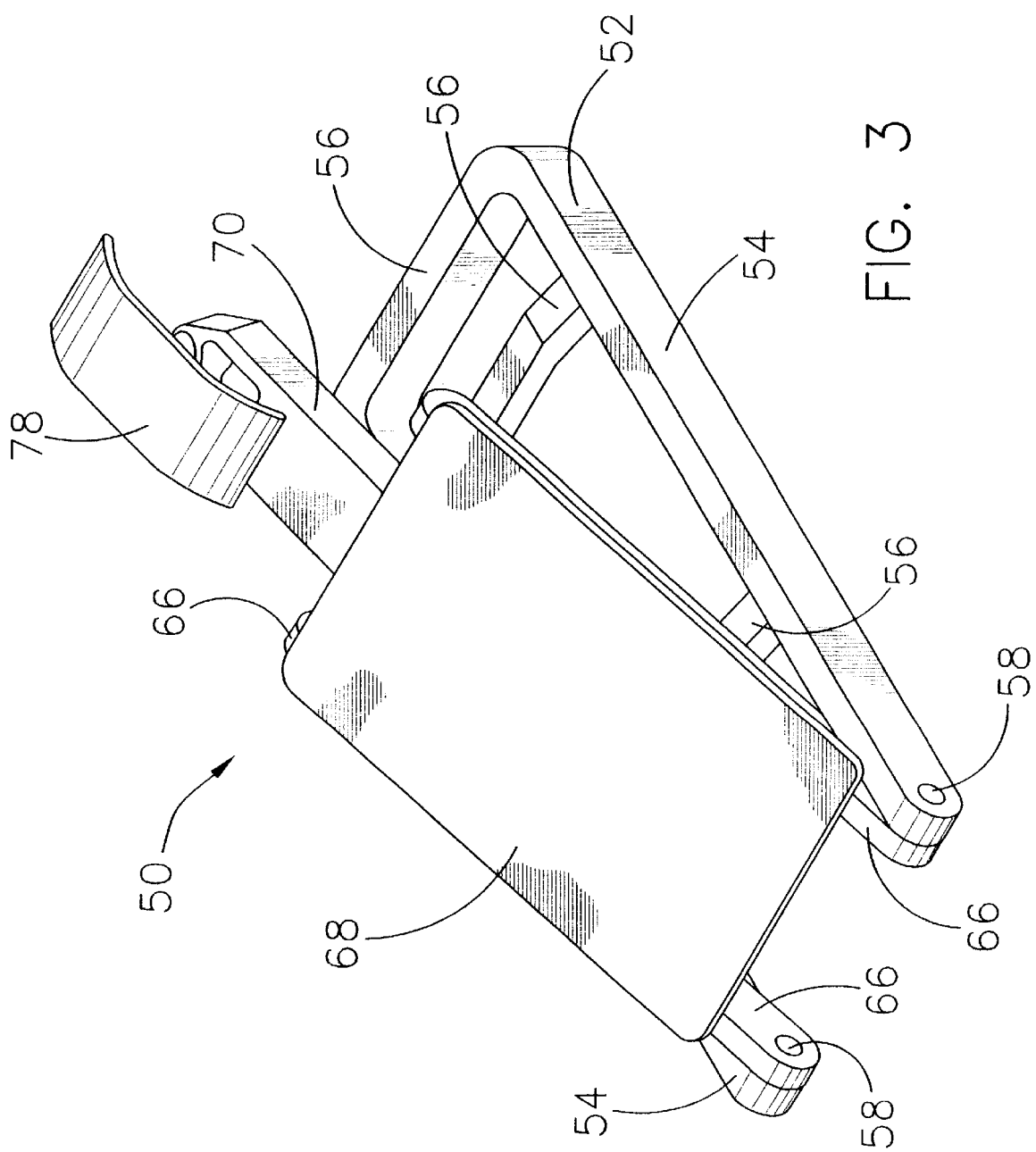
FIG. 3 is a perspective view of the interior mechanism of the present invention.

On the exterior of the outer envelope 20 there may be incorporated into the covering material one or more access portals 30 for accessing the interior of the outer envelope 20. The access portal 30 may include a closure mechanism to keep the access portal 30 securely closed and to keep any items within the outer envelope within. The access portal may be of any size. FIG. 2 depicts an access portal running the length of one side 28 for permitting the removal of the support mechanism 50 for maintenance, repair, modification or adjustment. The ability to remove the support mechanism from the outer envelope may also be useful for the cleaning or modification of the outer envelope. Although the side mounted full-length access mechanism is preferred on one embodiment of the invention, the scope of the invention is not so limited. For example, various smaller access portals may be located in positions on the outer envelope that permit access to portions of the support mechanism that are necessary to adjust the support mechanism 50, or to insert small items for storage in the outer envelope.

The closure mechanism 32 is intended to secure the access portal 30 in a closed condition when the user is not inserting items into or retrieving items from the interior of the outer envelope 20. Illustratively, the closure mechanism may comprise any of the following: zippers, flaps with fasteners such as Velcro, snaps or hooks, threaded eyelets, buttons, elastic bands, bands with fasteners, buckles, ties, zip lock seams, pairs of magnetic strips, draw strings 28 or tapes, etc. The preferred embodiment utilizes a zipper 44.

The outer envelope 20 also includes means for mounting the adjustable sports motorcycle support 10 to the sports motorcycle 2. Many methods of mounting are anticipated such as expanding latches, tension snaps, button clasps, Velcro, gas tank lid fastener, magnetic anchors, adhesives, etc.

One preferred embodiment employs three mounting straps 34 with quick release couplers. Two front mounting straps 34 may be attached to the outer envelope at a location at the front 22 and near the bottom 24 of the outer envelope. Additionally, a rear mounting strap 34 may extend in an opposite direction from the two mounting straps, and may be mounted on the outer envelope at a location generally where the top 26 and the bottom 24 meet. The front mounting straps may be attached to the sports motorcycle near the front forks and near the handlebars. The rear-mounting strap 34 may attach to the sports motorcycle under the rider's seat 16. Each strap may be fitted with a quick release coupler 36 so that the user can remove the adjustable sports motorcycle support 10 from the sports motorcycle 12 without having to remove the mounting strap from the sports motorcycle itself. This would be beneficial due to the need to frequently access the filler of the gas tank 14 for filling the tank with fuel. The quick release couplers 36 may include various coupling structures, such as standard belt buckles, tension clips, pins and mated eyelets, wedge clips, Velcro, elastic sections and hooks, etc. One preferred embodiment of the invention, shown in FIG. 2, employs buckle type clasps.

The bottom of the outer envelope 20 may have one or more feet 38 mounted thereon. The feet 38 may comprise a gripping non-skid material to assist in keeping the adjustable sports motorcycle support 10 in place on the sports motorcycle. The feet may include specific contouring that would nest or mate with contouring of the outer surface of the gas tank 14, or may be contoured in a manner that increases the grip of the feet on the surface of the gas tank 14. Each foot may comprise a plurality of relatively small beads of gripping material. Optionally, a coating of the entire bottom 24 of the outer envelope 20 may be employed to resist movement of the outer envelope with respect to the motorcycle.

Figure 4:
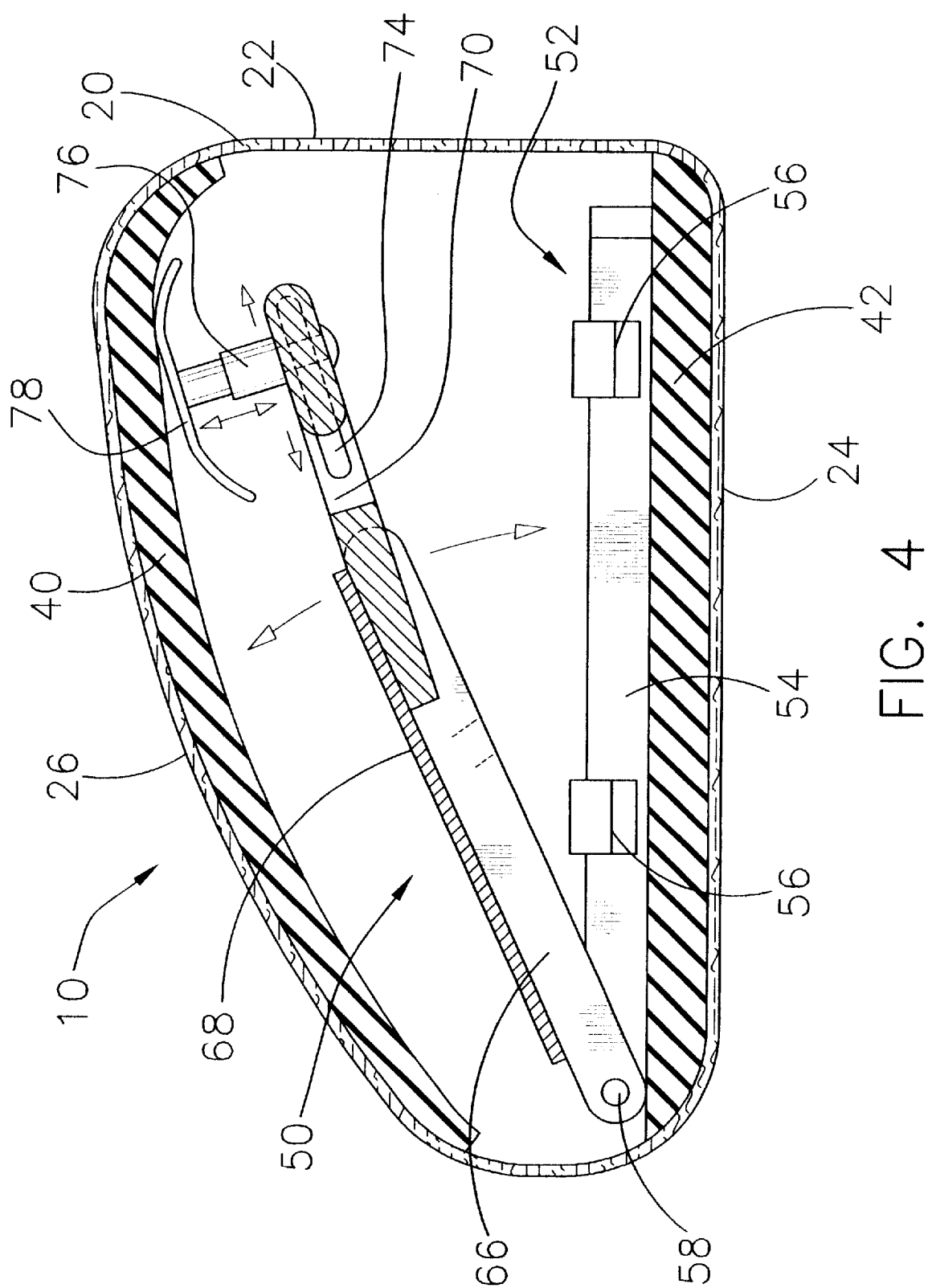
FIG. 4 is a cross sectional view of the present invention.
Figure 5:
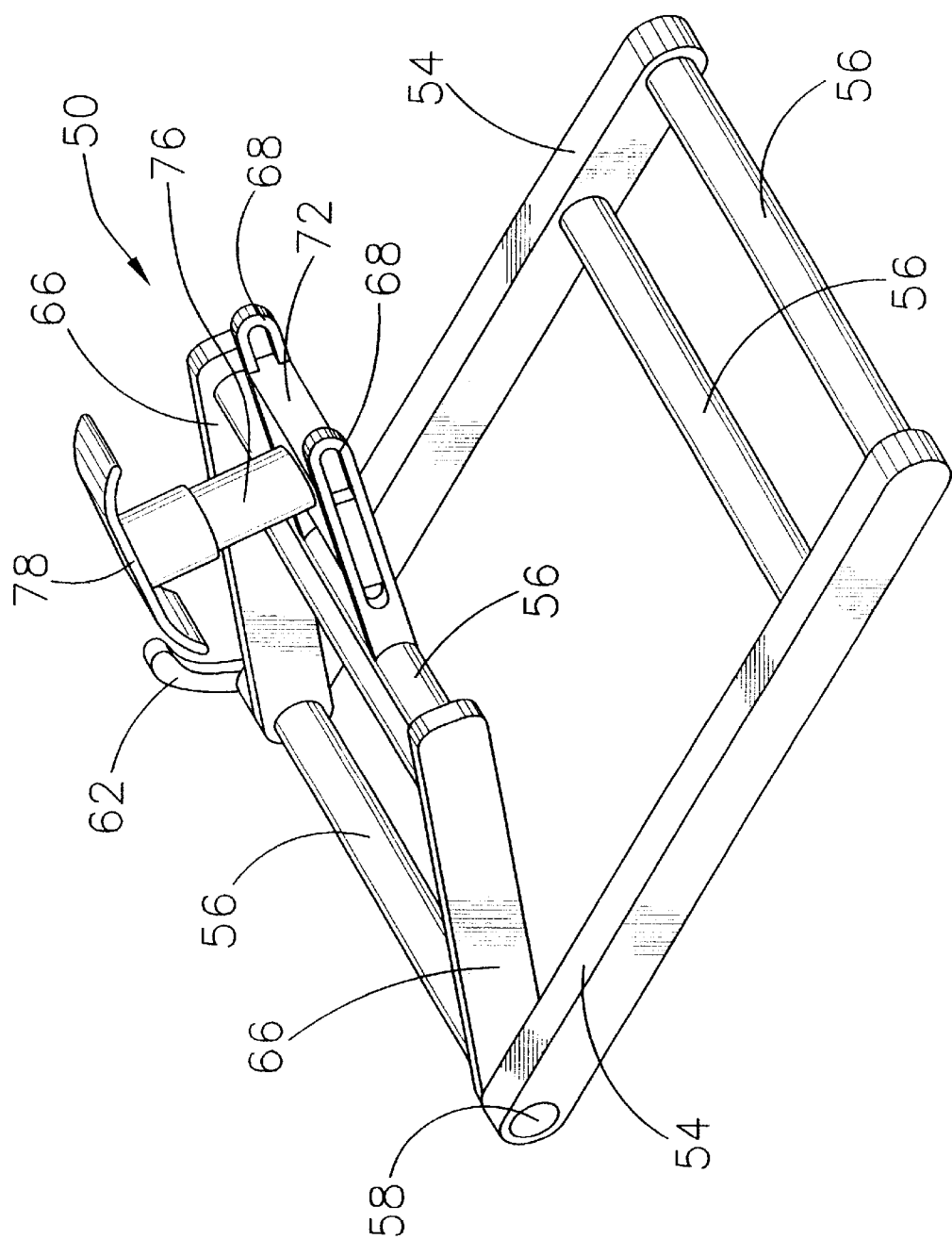
FIG. 5 is a perspective view of the interior mechanism of the present invention excluding the chest board.

Cushioning elements may be included in the interior of the outer envelope 20. The cushions may be comprised of a soft material that is comfortable to the human body when the body is rested against the material, such as foam or fiber batting, porous polyurethane, polystyrene beads, bladders with liquid or gel filling, etc. The cushioning elements may have several benefits. The cushions may insulate the support mechanism, and thus the driver, from some portion of the vibration produced by the engine or the road surface. The cushions may, assist in conforming the contour of the bottom of the outer envelope 20 to the shape of the gas tank 14. The cushions may also provide a comfortable surface for the body of the driver to rest. The cushions may also help to retain the shape of the outer envelope 20. The cushions may be attached to the interior of the outer envelope 20 (as shown in FIG. 4) or optionally may be attached to the base 52, a chest board 68, and/or a chin plate 78 of the support mechanism 50. The cushions (see FIG. 4) may include an upper pad 40 attached to the interior of the top 26 of the outer envelope 20, and a lower pad 42 attached to the interior of the bottom 24 of the outer envelope 20.

The support mechanism 50 is generally enclosed within the outer envelope 20 and may comprise a base 52 and a support assembly 64, which work together to support portions of the driver's body, such as the driver's head and torso, while driving.

The base 52 may comprise a foundation that can distribute the weight of the driver, bearing down upon the support mechanism, over the area of the gas tank 14. The composition of the base 52 may vary greatly, and may comprise a solid plate occupying a substantial portion of the bottom 24 of the interior of the outer envelope to a skeletal frame. One preferred embodiment of the base comprises a pair of rails 54 spanning a substantial length from a location near the front 22 of the interior of the outer envelope to a location near the area where the interior of the top 26 and bottom 24 sides meet. The rails may be constructed to conform to the longitudinal shape of the gas tank, or as depicted in the figures, may be relatively straight and depend on the lower pad to accommodate the shape of the gas tank 14. The two rails may be connected by one or more cross members 56. As with the rails 54, the cross members 56 may also be contoured to the shape of the gas tank 14 or rely on the lower pad 42 for conformation to the gas tank 14 shapes.

A hinge 58 may connect the base and the support assembly together, and may be located at the end of the base 52 where the top 26 and bottom 24 sides of the outer envelope 20 meet. The hinge may allow the base 52 and support assembly 64 to pivot with respect to each other. The hinge 58 may comprise a single elongated hinge running the length of the rear of the base 52, or optionally may comprise one or more short hinging mechanisms. The hinge may comprise a variety of hinge mechanisms, such as, for example, ball joints, wheel hinges, self-hinges, pin axis hinges, hook hinges, pleached hinges, etc.

The support assembly 64 may comprise several adjustable pieces to comfortably conform to portions of the driver's body, and these portions may include the abdomen, torso, neck and/or head. The support assembly 64 may comprise a single contoured plate, or may comprise several surfaces intended to be adjusted to fit the size, weight, angle and relative position of the user's body parts in accordance to the individual driver's stance and riding style.

In one preferred embodiment, the support assembly 64 comprises two lower support arms 66 extending up from the hinge 58. The lower support arms 66 are connected together by the chest board 68. At the end of the lower support arms 66, at a location opposite the hinge 58, is an adjustable cross member 56. The cross member 56 may extend between the lower support arms 66, and may support a pair of upper support arms 70. The upper support arms may be joined together by a slidable shuttle block 72 that is slidable in adjustment channels 74 that are integrated into the upper support arms 70. The shuttle block 72 may act as a mounting location for the adjustable support post 76. A chin plate 78 may be mounted n the end of the support post at a location opposite of the shuttle block 72.

The lower support arm 66 may comprise a single arm that supports the other pieces of the support assembly 64 thereon, or may comprise a plurality of arms that are connected by various structures such as cross members, in a manner similar to that employed on the base 52. The lower support arm 66 may support the bulk of the driver's weight bearing on the chest board 68. The lower support arm 66 may be contoured to conform to the profile of the user's body or may be relatively straight. The chest board 68 may comprise a single plate or be made up of individual pieces arranged in a design to support various parts of the driver's body. The upper support arm 70 is attached to the lower support arms 66, or optionally to the chest board 68. The upper support arm 70 may include elements for supporting the driver's head. Like the chest board 68 supports for the torso, the chin plate 78 is the surface on which the weight of the driver's head is supported. A support post 76 may be connected to an underside of the chin plate 78, and may include a height adjustment mechanism to set the level at which the driver's head rests on the chin plate. The support post 76 may be attached to a shuttle block 72 that is slidable along the length of the upper support arm 70 so that the distance between the driver's chest and chin may be adjusted for individual drivers. The manner of attaching the shuttle block 70 to the upper support arms may include a collar that encompasses the support arm. This manner of attachment would be particularly beneficial if only one upper support arm was employed in the design. Another manner of attachment includes adjustment channels 72 located in two or more upper support arms 70, or in the shuttle block 72, so that the shuttle block 72 and the upper support arms 70 may slide in relation to each other.

All of the adjustable elements of the support assembly 64 may include mechanical means to lock them in at least one position, and optionally in a plurality of positions. Such locking adjustable mechanisms are well known in the art and may include tension levers (such as are used in bicycle seat adjustments), thumb screws (such as is practiced in bulb changing poles), tension collars (such as is practiced in speaker stands), etc.

A biasing structure 60 may be employed between the base 52 and the support assembly 64 for acting as a shock absorber between the sports motorcycle 12 and the driver during use. The biasing structure 60 may comprise a buffer, cushion, or resilient material placed between the base 52 and the support assembly 64. Optionally, a compression spring may be mounted between the base 52 and the support assembly. One preferred embodiment includes a coil type torsion spring incorporated into the hinge 58, and may be similar to torsion springs used in pull down blinds and garage doors. A tension control 62 may be mounted on the device, and optionally incorporated into the hinge, that adjustable fixes the position of the support assembly with respect to the base. One tension control may be set using a cam lever similar to those used in quick release bicycle wheels, and could adjust the amount of tension force applied to a hinge pin contained in the hinge 58 that adjusts the degree to which the ends of the hinge pin squeeze the elements of the support assembly and the base together.

The elements of the support assembly 64 may be constructed from substantially rigid structural materials such as metal, wood, durable plastics, fiberglass, carbon composites, etc. The preferred embodiment referred to in the drawings is but one example of a support assembly and widely varied designs are anticipated.

In use, the adjustable sports motorcycle support 10 may be mounted on a sports motorcycle 12 by use of the mounting straps 34. Once mounted, the majority of the adjustable sports motorcycle support 10 may be easily removed and reattached through use of the quick release couples 36. The driver may open the outer envelope 20 to adjust the support mechanism to his or her preferences by opening the closure mechanism 32 to the appropriate access portal 30 on the outer envelope and adjusting elements of the support assembly 64. The user may extend or retract the chin plate 78 to achieve a comfortable distance between chin and chest. The height of the chin plate 78 may also be adjusted to provide the desired level of head support. After the user has made the desired adjustments to the support mechanism 50, the closure mechanisms 32 of any open access portals 30 may be closed, but optionally not before storing any small items in the outer envelope that would not impede the operation of the support mechanism 50 inside the outer envelope. The adjustable sports motorcycle support 10 may thus also be used as a conventional motorcycle tank bag.

While driving, the weight of the driver's body and head can be rested upon the adjustable sports motorcycle support 10 so that the driver does not get uncomfortable in the awkward position required by sports motorcycle design. The cushioning provided by the upper 40 and lower 42 pad, as well as the soft material of the outer envelope 20, may protect the user from the irritation of road and engine vibration and the biasing structure 60 would provide a shock absorbing buffer to minimize the impact of bumps and pot holes encountered on the road.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A device for supporting a driver's upper body and head while operating a sports motorcycle, the device comprising:
    an outer envelope comprising:
        top, bottom, front, and side panels defining an interior of the outer envelope;
        an access portal for accessing the interior of the envelope;
        a closure mechanism for closing the access portal;
        a mounting strap structure for mounting the outer envelope to the top of the gas tank of a motorcycle;
    a cushion positioned in the interior of the outer envelope adjacent to the bottom panel to absorb shock, vibration and to conform the bottom of the envelope to a shape of a portion of an upper surface of a gas tank of the motorcycle a support mechanism removably positioned in the interior of the outer envelope, the support mechanism comprising;
 a support assembly for supporting the weight of the driver's upper body and head, the support assembly comprising:
  a chin plate for supporting the driver's head;
  a chest board for supporting the weight of the drivers upper body; and
  a support frame;
 a base mounted on the support assembly to transfer the weight of the driver from the support assembly to the gas tank of the sports motorcycle; and a biasing mechanism for buffering transmission of weight and force between the support assembly and the base.

2. The device of claim 1 wherein the outer envelope has a wedge shape.

3. The device of claim 1 wherein the access portals is sufficiently large to remove the support mechanism from the interior of the envelope.

4. The device of claim 1 wherein the closure mechanism comprises a zipper.

5. The device of claim 1 wherein the mounting strap structure includes a quick release couple.

6. The device of claim 1 wherein the cushion comprises an upper pad and a lower pad.

7. The device of claim 1 wherein positions of the chin plate and the chest board of the support assembly are adjustable to fit a variety of sizes of drivers.

8. The device of claim 1 wherein the support frame includes a hinge pivotally connecting the base to the support assembly.

9. The device of claim 1 wherein the support frame comprises a lower support arm and an upper support arm.

10. The device of claim 9 wherein the lower support arm supports the chest board.

11. The device of claim 9 wherein the upper support arm supports the chin plate.

12. The device of claim 11 wherein the upper support arm includes a slidable shuttle block to adjust the distance between chest board and chin plate.

13. The device of claim 11 wherein the upper support arm includes an adjustable support post to adjust a height of the chin plate.

14. The device of claim 1 wherein the base is adapted to conform to the shape of a portion of an upper surface of the gas tank of the motorcycle.

15. The device of claim 1 wherein the biasing mechanism comprises a spring.

16. The device of claim 15 wherein the spring is disposed in the hinge joining the base to the support assembly.

17. A device for supporting a driver's upper body and head while operating a sports motorcycle, the device comprising:
 an outer envelope comprising:
  top, bottom, front, and side panels defining an interior of the outer envelope;
  an access portal for accessing the interior of the envelope;
  a closure mechanism for closing the access portal; and
  a mounting strap structure for mounting the outer envelope tithe top of the gas tank of a motorcycle;
 a cushion positioned in the interior of the outer envelope adjacent to the bottom panel to absorb shock, vibration and to conform the bottom of the envelope to a shape of a portion of an upper surface of a gas tank of the motorcycle;
 a support mechanism removably positioned in the interior of the outer envelope, the support mechanism comprising;
  a support assembly for supporting the weight of the driver's upper body and head, the support assembly comprising;
   a chin plate for supporting the driver's head;
   a chest board for supporting the weight of the drivers upper body; and
   a support frame;
  a base mounted on the support assembly to transfer the weight of the driver from the support assembly to the gas tank of the sports motorcycle; and a biasing mechanism for buffering transmission of weight and force between the support assembly and the base;

wherein the outer envelope has a wedge shape;

wherein the access portal is sufficiently large to remove the support mechanism from the interior of the envelope;

wherein the closure mechanism comprises a zipper;

wherein the mounting strap structure includes a quick release couple;

wherein the cushion comprises an upper pad and a lower pad;

wherein positions of the chin plate and the chest board of the support assembly are adjustable to fit a variety of sizes of drivers;

wherein the support frame includes a hinge pivotally connecting the base to the support assembly;

wherein the support frame comprises a lower support arm and an upper support arm;

wherein the lower support arm supports the chest board;

wherein the upper support arm supports the chin plate;

wherein the upper support arm includes a slidable shuttle block to adjust the distance between chest board and chin plate;

wherein the upper support arm includes an adjustable support post to adjust a height of the chin plate;

wherein the base is adapted to conform to the shape of a portion of an upper surface of the gas tank of the motorcycle;

wherein the biasing mechanism comprises a spring; and wherein the spring is disposed in the hinge joining the base to the support assembly.

* * * * *